United States Patent [19]
Leibach et al.

[11] Patent Number: 5,529,295
[45] Date of Patent: Jun. 25, 1996

[54] VIBRATION-COMPENSATING MOUNT ASSEMBLY

[75] Inventors: Markus Leibach, Hemsbach; Georg Feurer, Mörlenbach, both of Germany

[73] Assignee: Firma Carl Feudenberg, Weinheim, Germany

[21] Appl. No.: 342,410

[22] Filed: Nov. 18, 1994

[30] Foreign Application Priority Data

Nov. 24, 1993 [DE] Germany ............... 43 39 988.6

[51] Int. Cl.$^6$ ............... F16F 15/02; B60K 5/12
[52] U.S. Cl. ............... 267/140.15; 267/140.14; 188/267
[58] Field of Search ............... 188/267, 378, 188/379, 380; 248/636; 267/140.14, 140.15, 140.13

[56] References Cited

U.S. PATENT DOCUMENTS

| | | | |
|---|---|---|---|
| 4,624,435 | 11/1986 | Feudenberg | 267/140.14 |
| 4,638,983 | 1/1987 | Idigkeit et al. | 267/140.14 |
| 4,650,170 | 3/1987 | Fukushima | 267/140.14 |
| 4,669,711 | 6/1987 | Beer | 267/140.13 |
| 4,693,455 | 9/1987 | Andra | 267/140.14 |
| 5,236,186 | 8/1993 | Weltin et al. | 267/140.15 |
| 5,333,455 | 8/1994 | Yoshioka | 267/140.14 |
| 5,349,537 | 9/1994 | Burger et al. | 364/508 |

FOREIGN PATENT DOCUMENTS 4266514  9/1992  Japan ............... 267/140.15

*Primary Examiner*—Matthew C. Graham
*Attorney, Agent, or Firm*—Kenyon & Kenyon

[57] ABSTRACT

An active, vibration-countering mount assembly for a vibrating component is disclosed. The mount assembly comprises a supported mount supported on a machine element, a supporting mount supported via a spring element on the supported mount, and an inertial mass, movable back and forth by means of a drive parallel to the direction of the vibrations introduced by the vibrating component. The inertial mass is joined to the supported mount by a spring such that the inertial mass and the spring are not contacted by a liquid.

16 Claims, 3 Drawing Sheets

VIBRATION-COMPENSATING MOUNT ASSEMBLY

BACKGROUND OF THE INVENTION

The invention relates generally to a vibration-suppressing device and, more particularly, to a mount assembly for use with a support mount connected to a support frame. In this type of vibration-proofing device, a vibrating component (e.g., an engine) is attached to a support mount, which connects the vibrating component via an elastic element to a machine element (typically a frame or sub-frame of an automobile). A spring-mounted inertial mass, capable of axially reciprocal motion by means of a drive so as to move in an opposite direction with respect to the vibrations of the vibrating component, is joined to the support mount by a spring.

A mount assembly of this general type is disclosed in German Published Application No. 34 23 698 (corresponding to U.S. Pat. No. 4,650,170, the contents of which are incorporated herein by reference). This patent discloses a vibration-damping mount for use with a vibrating object with a mount core and a thrust block, between which a spring element and a liquid-filled working space of a hydraulic damping device are arranged. The mount also has a compensation membrane, provided with an actuator, that covers at least 10% of the delimiting surface of the working space. The mount is connected to a control unit comprising a process computer that receives a reference input signal passed to it from the vibrating object by a signal transducer. This information is utilized in conjunction with a further signal characterizing the status of the element to create a control signal that directs the actuator to move in a manner that compensates for the pressure changes in the liquid caused by the vibrations. The control unit that is employed in this device rigidly couples the movements of the compensation membrane to the movements of the crankshaft, which, as a practical matter, is not an optimal approach.

German Patent No. 34 33 255 (which corresponds to U.S. Pat. No. 4,638,983, the contents of which are incorporated herein by reference) discloses an apparatus in which a hydraulically damped rubber mount is used to support a vibrating mechanical accessory on a sub-frame. An actuator having an electromagnetic drive that is associated with a liquid-filled working space connects the accessory to the sub-frame. The drive is linked to a control system employing both a signal taken from the vibrating mechanical accessory and a characteristics diagram to generate an actuation signal. This actuation signal is fed to a power amplifier, and thence to the actuator drive. In this device, the actuator is activated in a controlled fashion so that the vibrations caused by the mechanical accessory in two previously defined operating states are compensated for. To achieve this goal, the actuator is triggered by means of a characteristics diagram in which empirically determined reactions are stored as a function of a state variable of the mechanical accessory which describes its operating state. One such state variable, for example, may be the rotational speed of the crank shaft.

In the automotive field, this approach provides excellent isolation of vibrations that arise at certain rotational speeds and under certain load conditions. However, the spectrum of possible and actually occurring vibrations that result during real-world driving is not sufficiently covered by this approach. Furthermore, the determination of the necessary control data is very laborious.

There remains a need for the further development of a mount assembly of the aforesaid kind such that vibrations can be optimally compensated for in their entirety.

SUMMARY OF THE INVENTION

In the present invention, a mount assembly for a vibrating component is provided. The mount assembly comprises a support mount that is connected at one end to a vibrating component (such as an engine), and at its other end is supported on a machine element (which may be a section of the frame of an automobile). Connected to this machine element is an active vibration canceler. The vibration canceler comprises a support plate that is rigidly affixed to the machine element on one side and to which an actuation coil is rigidly attached on its other side. An axially slidable inertial mass is linked to the support plate via a spring element. The inertial mass is selectively shiftable by means of a drive in a manner that creates vibrations in the mass-spring system that are transferred to the support mount. By judiciously selecting the frequency and amplitude of the vibrations arising within the vibration canceler, there is created a pattern of vibrations which destructively interferes with the vibrations arising from the vibrating component, thereby canceling such vibrations out. The system does not require the use of any hydraulic liquid to effect the damping.

The mount assembly is usable with any vibrating component. For example, the vibrating component can be an engine, a transmission, an air-conditioning compressor, a generator, or entire assemblies such as the wheels of a vehicle. The vibration canceler can be attached not only at one specific point, but can, for example, be fastened to auxiliary frames, to the frame rails, to the engine, or at any desired point on the body of an automobile or other machine.

In the vibration canceler, the resonant frequency of the vibratory system consisting of the inertial mass and spring element is at least as great as the frequency of the vibrations to be compensated for. The inertial mass is rapidly shiftable by means of the solenoid or plunger coil (serving as the actuator coil) fixedly secured to the support plate. The spring element links the inertial mass to the support plate and sub-frame, and is displaced by the manner in which the solenoid coil is energized.

The inertial mass comprises a pot magnet and housing. The pot magnet surrounds the plunger coil radially on the inside and outside at least partly concentrically, and is guided in the axial direction by means of an axially projecting guide attached to the support plate. The use of such structure and the concomitant maintenance of a uniform air gap, traversed by a magnetic field, provides for the inertial mass to be guided with a uniform clearance along the axial projection. When vibrations are introduced, the axial guidance of these elements provides the vibration canceler with linear operating characteristics. Moreover, the magnetic field in the air gap is oriented radially so as not to exert a static preload on the spring element along the axial direction of motion. Because the spring element is not statically loaded by the static magnetic force, the spring material does not experience permanent sagging even after extended use.

The vibration canceler allows for the active reduction of the incoming vibrations. Its versatility permits it to be made to vibrate in order to modify the frequency and intensity of vibrations in the attached component as may be desired.

The vibration canceler can be housed separately from the support mount. This separate housing can be fastened onto the side of a support plate that is part of or is attached to the support frame so that the vibration canceler housing faces away from the support mount. When an alternating current is introduced into the solenoid coil of the vibration canceler, a force is generated between the pot magnet and the support plate fastened to the frame (or other machine element to which a vibrating component is attached). A spring element integral with the support plate permits the transference of force between the pot magnet/housing and the support plate. Hence, in a configuration of this kind, the solenoid coil need not be fastened to the machine element by a separately attached retainer.

The spring element may also be thought of as the elastic part of an overall suspension for linking the support plate and integrally attached coil to the pot magnet and its housing. Taken together with outer and inner guiding supports provided by projections extending axially from the rear of the support plate towards the vibration canceler, this suspension provides good utilization characteristics over a long service life and permits the vibration canceler to be used in various installation positions whilst providing the pot magnet with a defined spatial zero position. The pot magnet is guided with respect to the activation solenoid coil in such a way that even when transverse forces act on the pot magnet, no impermissible friction or force occurs between the magnet and the coil.

The suitability-to-task of the vibration canceler is somewhat affected by the size of its inertial mass to the size of the inertial mass of the vibrating component. The magnitude of the inertial mass of the vibration canceler can be expressed in a ratio of 1:100 to 1:1000 with respect to the magnitude of the mass of the corresponding vibrating component.

In addition to versatilely allowing the counteraction of low-frequency vibrations, the mount assembly can also compensate for a wide spectrum of high-frequency vibrations. Low-frequency vibrations are introduced in a motor vehicle primarily when passing over surface irregularities or when the starting the engine. These vibrations are felt as vibration within the vehicle or are heard as noise, which directly affects driving comfort.

High-frequency vibrations in a motor vehicle, which lie in the range between 500 and 1000 Hz, arise because in practice, the masses of the moving engine parts are not perfectly balanced, thus giving rise to such vibrations. Such high frequency vibrations may also arise from the resonant frequencies of accessories fastened to the engine, the drive unit itself, and assemblies such as the wheels. These vibrations have only a relatively small amplitude, but can become quite annoyingly evident as droning vibrations while driving. It is therefore desirable to isolate and compensate against these vibrations.

The instant invention compensates for both high and low frequency vibrations. This vibration compensation is accomplished not merely on the basis of a single input variable, but rather, is empirically based as a function of one or more input variables and/or operating states, depending on the vehicle type. The vibrations that arise can thus be eliminated by the mount assembly in a manner not previously attainable. The mount assembly further permits the easy adaptation of particular compensation characteristics to different motor vehicle types and rotation speeds, thereby assuring the effective control of vibrations under all operating conditions.

The vibration canceler can be controllable by means of a process computer, which can be programmed to reflect the specific requirements of a particular application. The correlation between the controlled variable, a reference signal, and further input variables relating to the engine and/or other components is reflected in the programming. These input variables, in addition to the reference signal, can include a signal reflecting an engaged gear, the throttle valve position, the degree of vacuum in the intake manifold, torque absorbed by the engine, and/or deflection of the engine mount. To control the vibration canceler, a reference signal that suitably reflects the vibrations present is continuously entered in the process computer. The reference signal and the other input variables are processed by the computer, by phase shifting and/or frequency multiplication and/or amplitude multiplication, so as to provide an output signal for the actuation of the vibration canceler that optimally creates interfering vibrations with which to negate the unwanted vibrations. As a result, the vibrations are isolated in a very effective manner. (Additional discussion of the use of such signals to control vibrations is set forth in U.S. Pat. No. 5,349,537, the contents of which are incorporated herein by reference.)

BRIEF DESCRIPTION OF THE DRAWINGS

A mount assembly constructed according to the principles of the invention is explained in more detail below with reference to a particular embodiment, in which.

DETAILED DESCRIPTION

Figure 1:
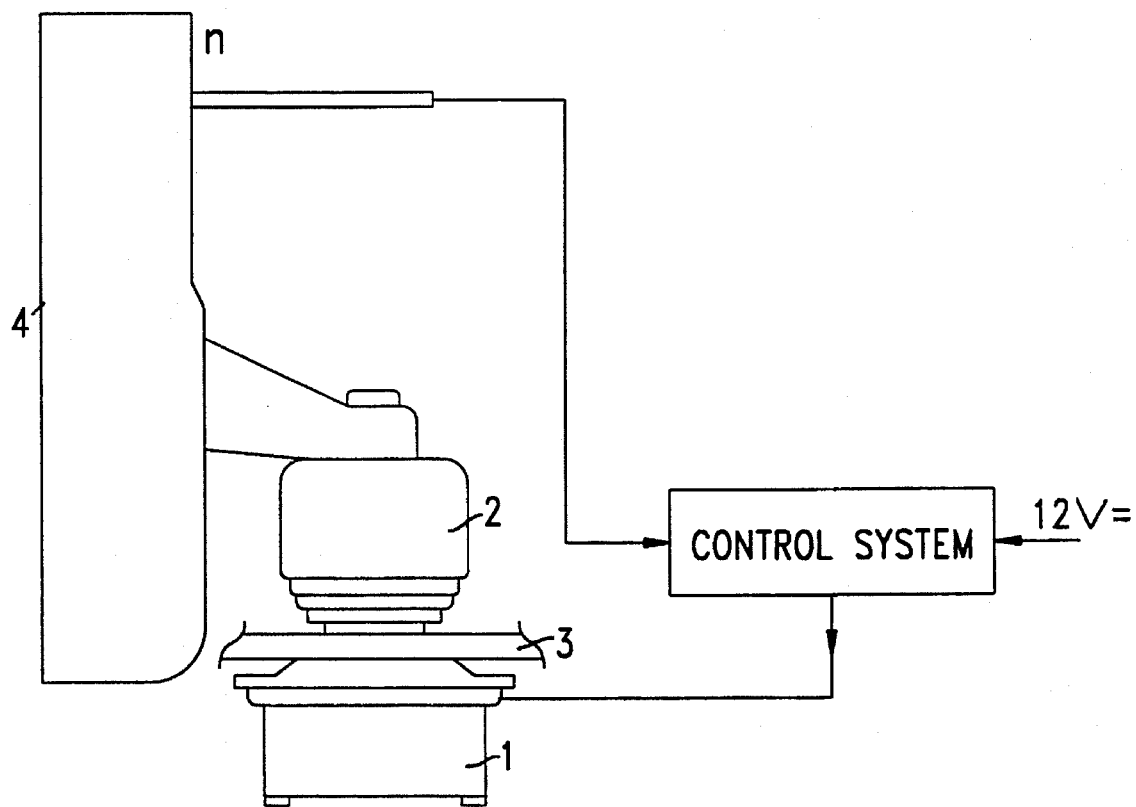
FIG. 1 is a schematic view showing the connections among the principle elements employed in the mount assembly, and in particular shows the vibration canceler as part of an overall control circuit.

The mount assembly for a vibrating component 4 comprises a support mount 2 that is in turn supported on a machine element 3. The vibrating component 4 may be an engine, a transmission, an air-conditioning compressor, a generator, or other assemblies such as the wheels of a vehicle. The support mount 2 can be a simply constructed rubber and/or metal mount. The machine element 3 may, for example, be a section of the frame of an automobile. As shall be explained in further detail below, the support mount 2 is coupled by means of a spring to an inertial mass 7 of a vibration canceler 1, which does not utilize hydraulic fluid for its operation. The support mount 2 is coupled to the vibration canceler 1 so as to provide a compensatory, interfering vibration to the vibrations that may arise within the associated vibrating component 4 as shall be explained below.

Figure 3:
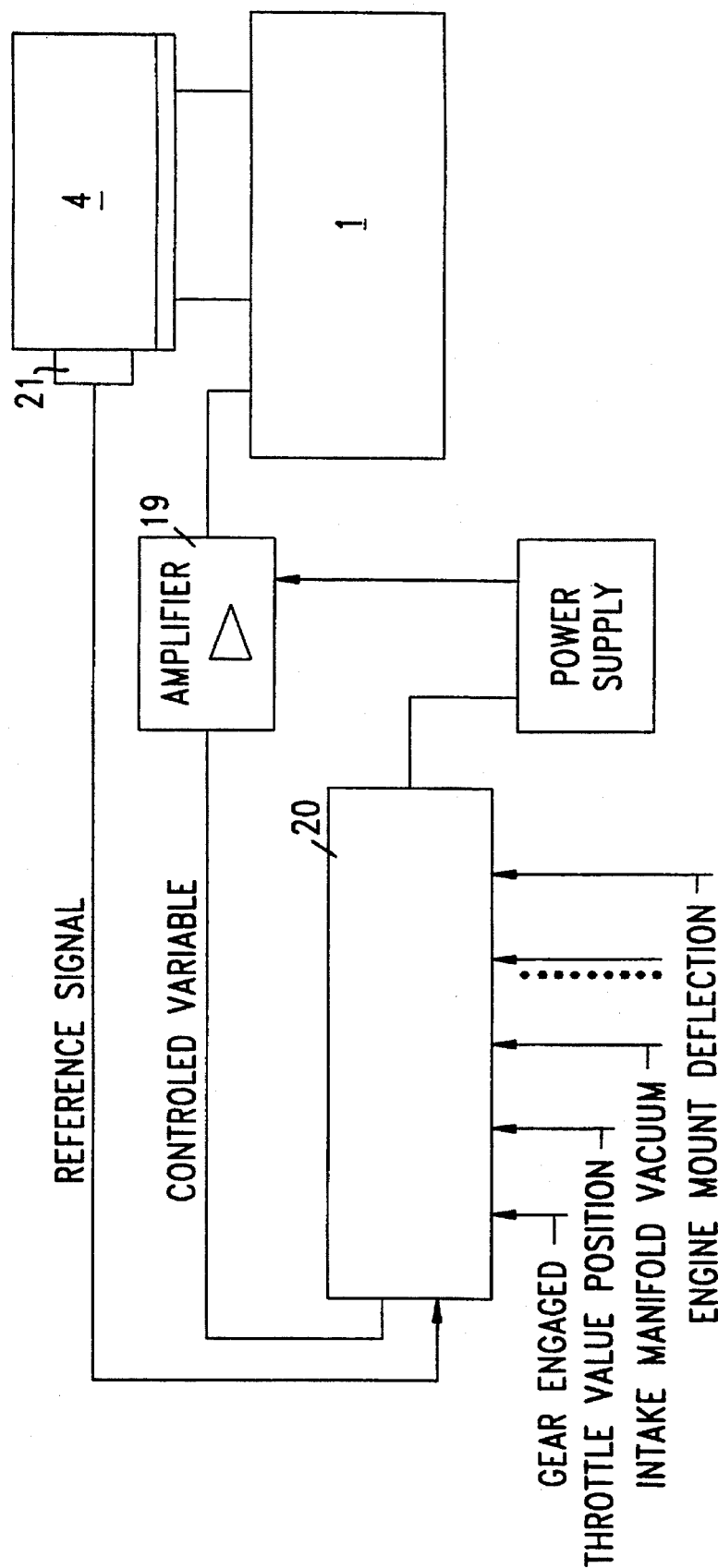
FIG. 3 is a block diagram illustrating a control system used with the vibration canceler.

FIG. 3 schematically depicts the vibrating component 4 and a signal transducer 21 that preferably measures engine rotation speed. Programmable process computer 20 utilizes the reference signal from the signal transducer 21, and may also operate on additional input variables, such as the identity of the gear engaged, the throttle valve position, the vacuum level in the intake manifold, the engine torque, or the deflection of the engine mount, among others. The input variables are processed in the computer 20, located in the control unit, in accordance with a specific program and brought into the desired corresponding phase with respect to the reference signal. The use of a computer also permits changes to the amplitude response and frequency of the reference signal. The signal generated in this manner then passes via a power amplifier 19 to the vibration canceler 1.

Figure 2:
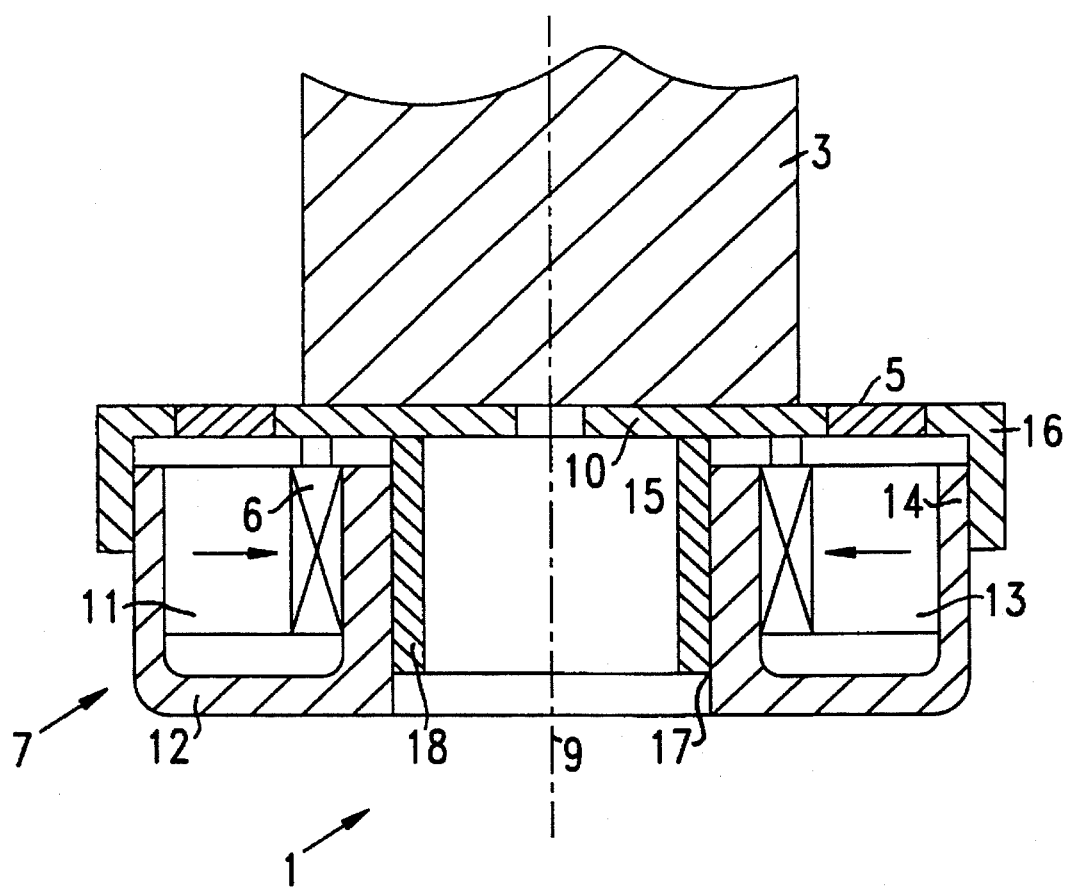
FIG. 2 shows a section of the active vibration canceler.

FIG. 2 illustrates an embodiment of the vibration canceler 1. The vibration canceler is fastened to the machine element 3, which can otherwise transmit vibrations along its axis 9. The vibration canceler 1 comprises a support plate 10 that is fixedly joined to the machine element 3. In the embodiment depicted here, the machine element 3 and the support plate 10 are bolted to one another.

A pot magnet 11 and a magnet housing 12 circumferentially surround a solenoid or plunger coil 6 radially on both the inside and outside of the solenoid coil. The solenoid coil 6 is fastened to the support plate 10 in a rigid manner so as to prevent any relative movement of the solenoid coil 6 with respect to the support plate 10. The solenoid coil 6 is connected to an alternating current power supply unit (not shown here). The solenoid coil 6 is arranged so that it is axially aligned with the movement of machine element 3, the pot magnet being vibratingly coupled to support plate 10 by means of a spring element 5, as shall be further described below.

The inertial mass of vibration canceler 1 consists of a pot magnet, the pot magnet comprising a magnet 11 and a magnet housing 12. The size of the inertial mass 7 can be varied by changing the mass of the magnet housing 12. In a similar vein, the elastic properties of the spring element 5 can be selected so as to optimize the resonant frequency of the vibration canceler 1 for a given environment.

The magnet housing 12 is joined in the region of its outer periphery to an edge region 16 of the support plate 10 by means of a press fit 14, the support plate 10 and edge region 16 being joined together by means of the spring element 5, which is made of elastomeric material. The pot magnet is guided in the region of its radially inner periphery by an axial projection 18 that is tubular in shape and rigidly fastened to support plate 10. Projection 18 is provided, in the region of its outer periphery, with a friction-reducing surface coating 17 which improves the response characteristics of the vibration canceler 1.

Vibrations such as may be introduced into the machine element 3 can be reduced or canceled by triggering the plunger coil 6 so as to produce a counter-vibration. An alternating current is introduced into plunger coil 6 as a function of the vibrations from the vibrating component 4. This varying current creates forces which cause the axial vibratory displacement of the pot magnet 11 with respect to the support plate 10. These elements are linked together via the spring element 5 so as to permit oscillations with respect to one another.

The vibrating component 4 generating the vibrations is joined to the vibration canceler 1 via the support mount 2 and the machine element 3. Signal transducer 21, connected to the vibrating component 4, provides an electrical signal that is in a phase relationship to the interference vibrations evoked by the inertial force. In other words, displacement of component 4 downwardly generates a positive electrical signal at signal transducer 21. This signal is processed in the process computer 20 along with information concerning crank shaft rotation speed and other input variables, and passed via power amplifier 19 to the vibration canceler 1, in such a way that vibration canceler 1 is moved in the opposite direction, in this case upwardly, so as to destructively interfere with and thereby cancel the initial vibration. Complete vibration compensation is thus possible. Other interference vibrations are excited in a corresponding manner and therefore have precisely defined speed-related phase correlations. These correlations are programmed into process computer 20 and are called up in accordance with the incoming reference signal and input variables.

What is claimed is:

1. A mount assembly for a vibrating component, comprising:

a support mount configured for attachment to a machine element, said support mount being configured to oscillate along a preferred axis;

a supporting mount configured to be rigidly connected to the machine element;

a spring element having first and second sides, said spring element being attached along one of its sides to the supporting mount;

an inertial mass attached along the other side of spring element and being linked to the supporting mount in a manner that permits the oscillatory motion of the inertial mass with respect to the supporting mount along the preferred axis of vibration of the support mount; and an actuator that comprises a magnet and a coil spaced apart from one another for enabling the controlled oscillatory movement of the inertial mass with respect to the supporting mount, wherein the magnetic field provided by the actuator is oriented so as not to exert a preload on the spring element along the preferred axis of vibration;

wherein the inertial mass and the spring are not contacted by a liquid.

2. A mount assembly according to claim 1, wherein the ratio of the respective sizes of the inertial mass to the vibrating component is between 1:100 and 1:1000.

3. A mount assembly according to claim 1, wherein the inertial mass is housed separately from the spring.

4. A mount assembly according to claim 2, wherein the inertial mass is housed separately from the spring.

5. A mount assembly according to claim 3, wherein the machine element has first and second sides, the support mount is attached to a first of these two sides, and the housing of the inertial mass is operatively connected to the opposite side of the machine element.

6. A mount assembly according to claim 1, wherein the inertial mass comprises the magnet and a housing for the magnet.

7. A mount assembly according to claim 1, wherein the coil of the actuator is fixedly secured to the supporting mount.

8. A mount assembly according to claim 5, wherein the coil of the actuator is fixedly secured to the supporting mount.

9. A mount assembly according to claim 6, wherein the coil of the actuator is fixedly secured to the supporting mount.

10. A mount assembly for a vibrating component, comprising:

a support mount having a first end and a second end, said support mount being connected at its first end to the vibrating component;

a vibration canceling assembly operatively connected to the second end of the support mount, said vibration canceling assembly comprising a support plate rigidly attached to the support mount, a coil rigidly attached to the support plate, a spring attached at one end to the periphery of the support plate, and an inertial mass connected to the other end of the spring, said inertial mass comprising an annular magnet concentric with the coil, and;

an actuator for energizing the coil in a selective manner so as to create a vibratory motion of the inertial mass with respect to the coil that runs counter to the vibrations of the vibrating component;

wherein the magnetic field provided by the magnet with respect to the coil when the coil is not energized is oriented so as not to exert a preload on the spring.

11. A mount assembly as set forth in claim 10, wherein the support mount comprises an elastic member.

12. A mount assembly as set forth in claim 10, wherein the inertial mass further comprises a housing for the magnet.

13. A mount assembly as set forth in claim 12, wherein the housing of the magnet circumferentially surrounds the magnet on both inner and outer radial surfaces.

14. A mount assembly as set forth in claim 13, further comprising an axially extending projection extending through the center of the coil so as to provide support for the inertial mass against excessive radial movements.

15. A mount assembly as set forth in claim 12, wherein the housing is attached to the spring via an annular ring with respect to which the housing is capable of axial movement.

16. A mount assembly as set forth in claim 15, further comprising an anti-friction coating between the annular ring and the housing of the inertial mass.

* * * * *